Oct. 13, 1925.
R. W. MOSES
SHEARS
Filed June 28, 1922     3 Sheets-Sheet 3
1,556,800
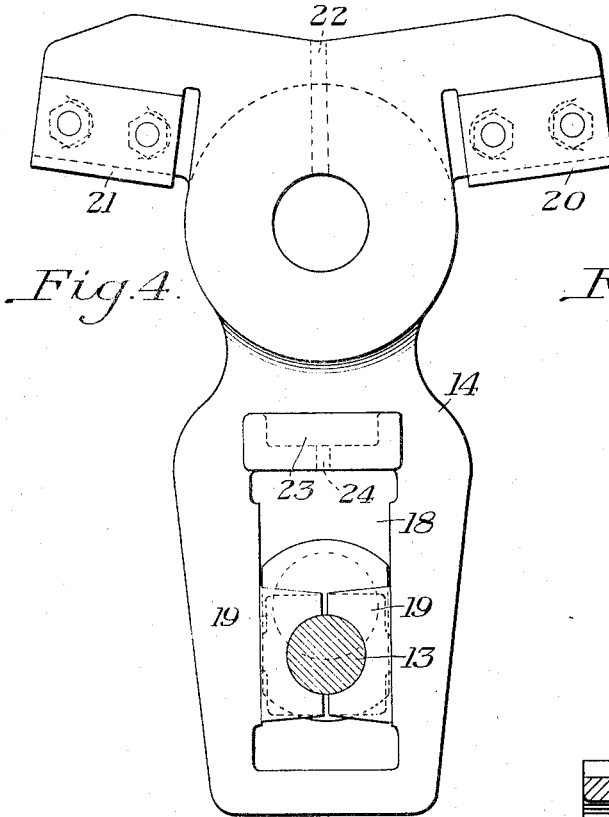
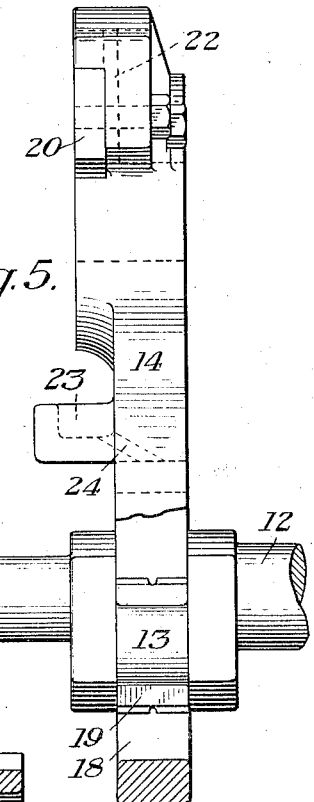
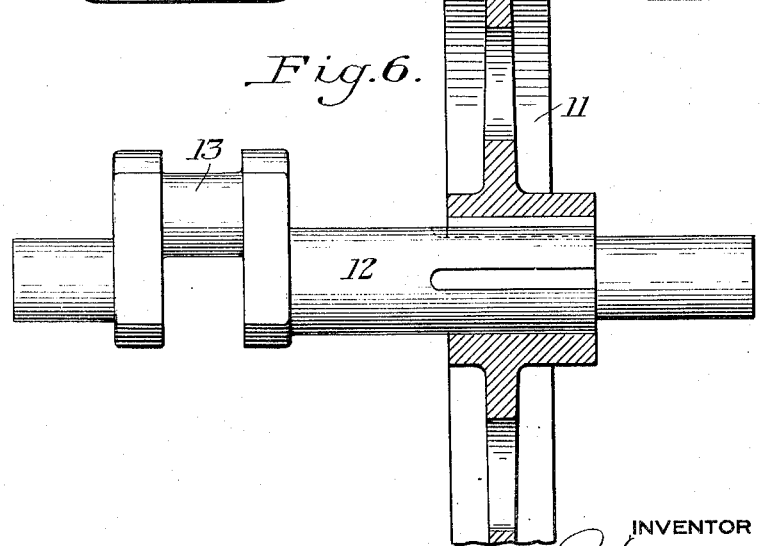
INVENTOR Patented Oct. 13, 1925.

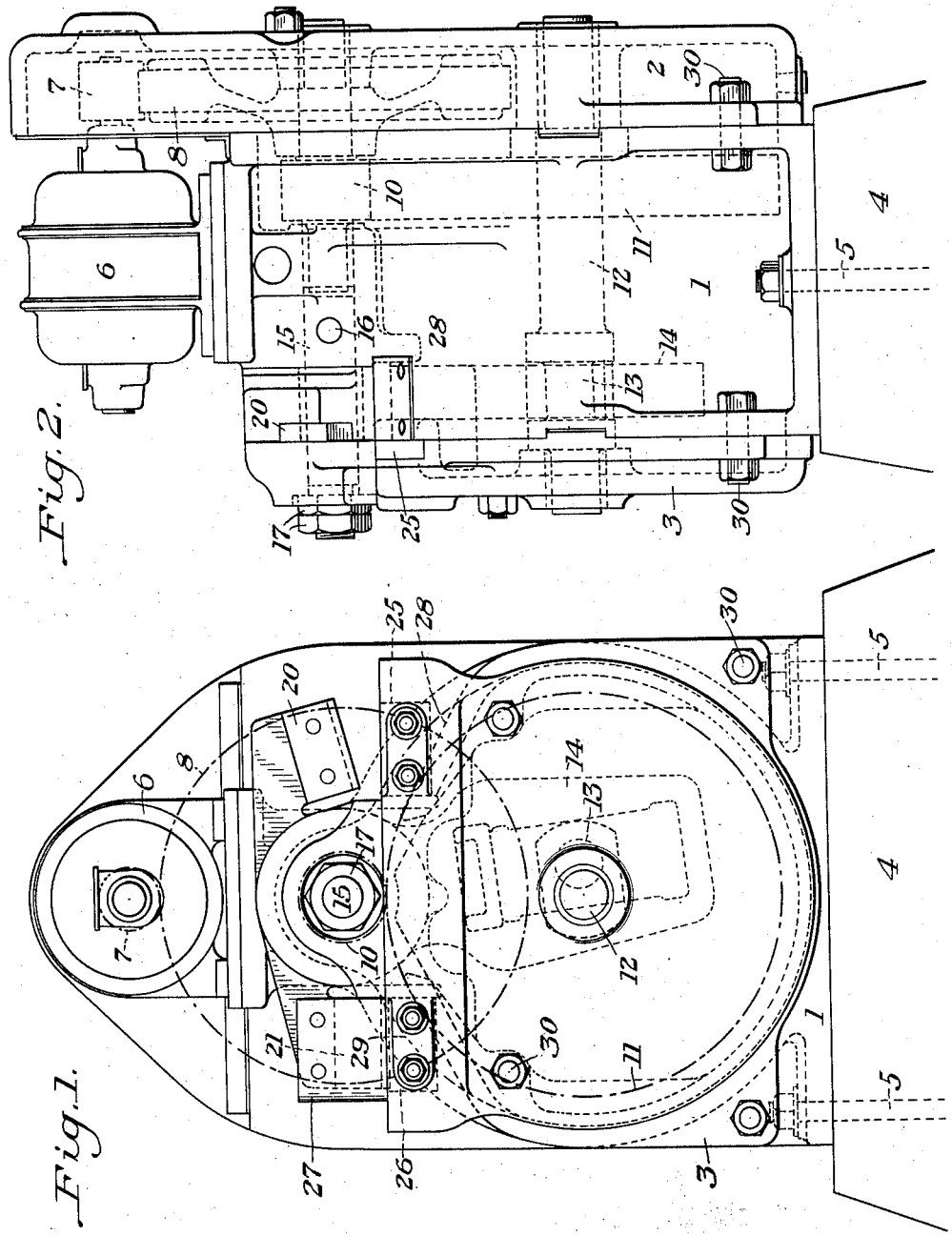

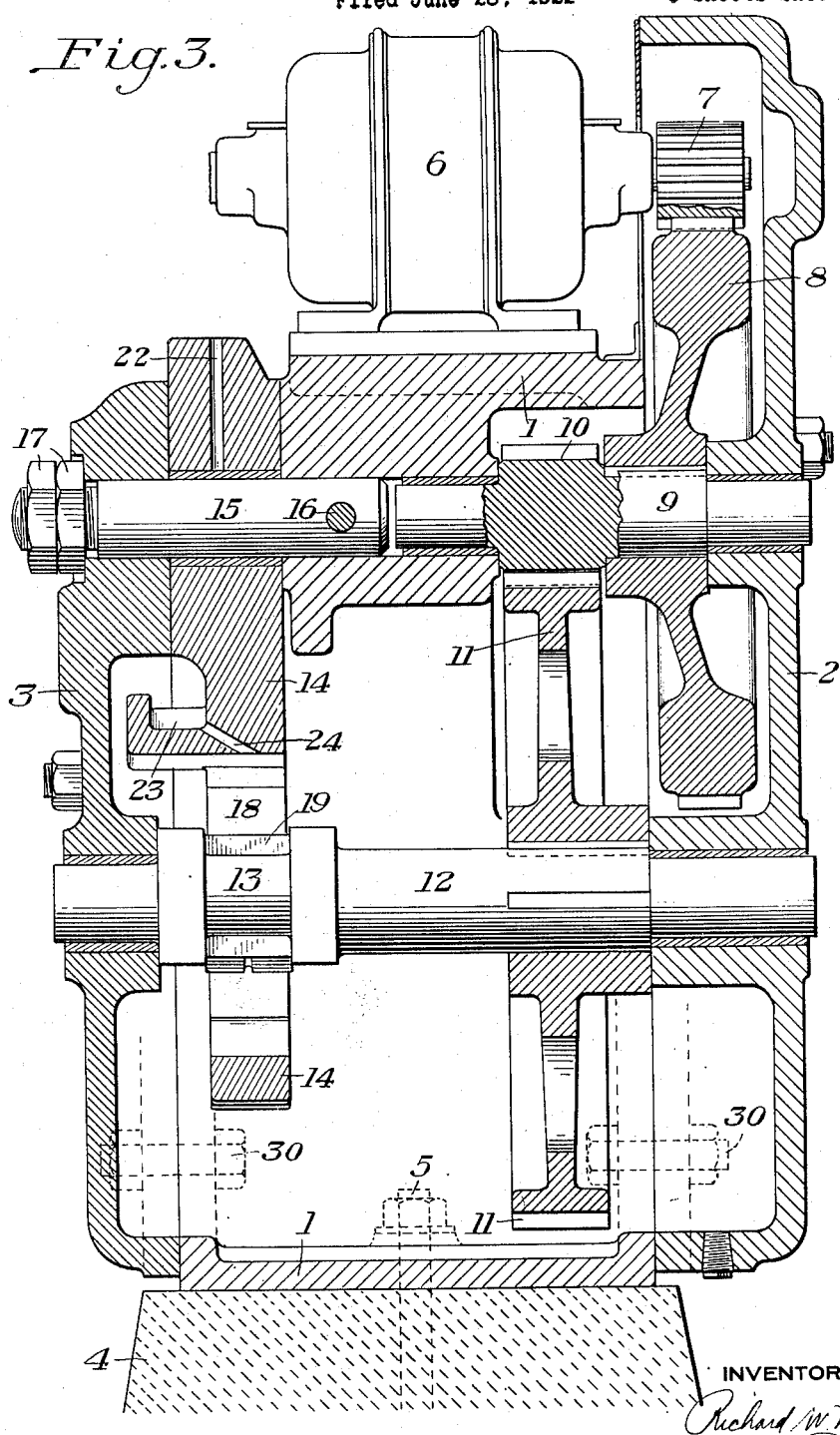

1,556,800

UNITED STATES PATENT OFFICE.

RICHARD W. MOSES, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

SHEARS.

Application filed June 28, 1922. Serial No. 571,491.

*To all whom it may concern:*

Be it known that I, RICHARD W. MOSES, a citizen of the United States, residing at Pittsburgh, Allegheny County, Pennsylvania, have invented a new and useful Improvement in Shears, of which the following is a full, clear, and exact description, reference being had to the accompanying drawings.

My invention relates to shears, and is useful particularly in cutting the crop ends off of bars in merchant mills, although, of course, it is not limited to that use. My shear is portable and is self-contained and may therefore be placed at any desired position or moved from one position to another, as required by the condition of the mill with which it is used.

My invention will be better understood by reading the following description taken in connection with the accompanying drawings, illustrating one embodiment thereof and in which:

Figue 1 is an end elevation of a shear embodying my invention;

Figure 2 is a side elevation of the device shown in Figure 1;

Figure 3 is a central vertical longitudinal section through the device of Figure 1;

Figure 4 shows the shear carrier in front elevation;

Figure 5 is a side elevation of the carrier shown in Figure 4; and

Figure 6 shows a view of the crank shaft for operating the shear carrier.

Referring to the drawings, the device comprises a frame 1 on the sides of which are placed housings 2 and 3. The frame 1 may be anchored to a concrete or other suitable foundation 4 by anchor bolts 5. A motor 6 is mounted on top of the frame 1 and has a pinion 7 on the shaft thereof which engages with a gear 8 mounted on a shaft 9 which is journaled at one end in the frame 1 and at the other end in the housing 2. This shaft carries a pinion 10, which meshes with a gear wheel 11, carried by the crank shaft 12, one end of which is journaled in the housing 2 and the other end of which is journaled in the housing 3. This shaft is provided with a crank 13, as shown in Figure 6. The motor is adapted to drive the shaft 12 in either direction. A shear carrier 14 having a general T shape is pivotally mounted on a short shaft 15, one end of which is carried by the housing 3. The shaft 15 is held in the frame 1 by pin 16, which passes therethrough. Lock nuts 17 are screwed on to the other end of the shaft 15 to hold the same tightly in place. The shear carrier 14 is provided with an opening 18 in which is placed a split slide block 19. The split block 19 engages the sides of the opening 18 and is provided with an opening to receive the crank 13 of the shaft 12. The head of the carrier 14 carries the shear blades 20 and 21, which may be bolted or otherwise secured thereto. When in place, the shear blades 20 and 21 are on opposite sides of a vertical line passing through the longitudinal axis of the shaft 15.

The shear carrier is provided with an opening 22, through which the bearing for the carrier on the shaft 15 may be lubricated. The carrier is also provided with a container 23, with which a channel 24 communicates, and through which channel lubricant may be supplied to the bearing between the block 19 and crank 13.

Fixed shears 25 and 26 are carried by the frame 1. The shear blades 25 and 26 cooperate respectively with the movable shear blades 20 and 21. When only one set of blades is being used, a guard 27 may be placed over the other set of blades for the protection of the operator. The frame 1 is rounded off at 28 and 29, so that the crop ends which are cut from bars or other articles may readily fall away from the shear.

While the device is particularly useful in cutting short pieces off of the ends of bars or similar articles, it may be used for cutting the bars into long lengths. In that case, the bars or other articles would be placed between the shears at an angle so that the bar would clear the housing 3.

The housings 2 and 3 are fastened to the frame by bolts 30 or by any other suitable means.

While a shear of this type may be used to cut with both sets of knives simultaneously, ordinarily only one set of knives will be used, the main purpose of having right and left sets of knives being to enable a portable shear of this type to be placed at any convenient point in a mill. When the left-hand set of knives is being used, the crank shaft will be rotated in a counter-clockwise direction and when the right-hand set of knives is being used, the crank shaft will be rotated in a clockwise direction. The purpose of providing the pairs of knives on the right and left hand sides of this machine is to enable the machine to be placed in any convenient position in the mill, on either the right hand side or the left hand side of a delivery table. When, for example, the right hand pair of knives is being used, the left hand pair of knives will be shielded, as shown in Figure 1 of the drawings, and vice versa. When the right hand pair of knives is being used, the crank shaft will be rotated in a clockwise direction in order to obtain the maximum leverage at the moment when the material being sheared offers the maximum resistance to shearing and to obtain a quick opening of the knives after the cut is made.

While I have shown and described only one embodiment of my invention, it will be understood that I am not limited to the exact arrangement shown and described, as many changes may be made in the details without departing from the spirit of my invention.

I claim:

1. A shear, comprising a frame, a pair of fixed shear blades mounted on the frame, a lever pivoted to said frame and carrying a pair of shear blades on opposite sides of its longitudinal axis for cooperation with the fixed blades, said lever having a slot therein, and means for oscillating said lever, comprising a crank shaft, a block carried by the crank pin and slidably mounted in said slot, and means for rotating said shaft in either direction, substantially as described.

2. A shear, comprising a frame, a pair of fixed shear blades mounted on the frame, a T-shaped carrier pivoted to said frame, a pair of shear blades mounted on the head of said carrier on opposite sides of its pivot for cooperation with the fixed blades, and means for oscillating said carrier, comprising a crank shaft, a block carried by the crank pin and slidably mounted in a slot in said carrier, and means for rotating said shaft in either direction, substantially as described.

3. A shear, comprising a frame, a pair of fixed shear blades mounted on the frame, a lever pivoted to said frame on a stationary pivot and carrying a pair of shear blades on opposite sides of its longitudinal axis for cooperation with the fixed blades, said lever having a slot therein, and means for oscillating said lever, comprising a crank shaft, a block carried by the crank pin and slidably mounted in said slot, and means for rotating said crank shaft in either direction, substantially as described.

4. A shear, comprising a frame, a pair of fixed shear blades mounted on the frame, a lever pivoted to said frame on a stationary pivot and carrying a pair of shear blades on opposite sides of its longitudinal axis for cooperation with the fixed blades, said lever having a slot therein, means for shielding either pair of cooperating knives, and means for oscillating said lever, comprising a crank shaft, a block carried by the crank pin and slidably mounted in said slot, and means for rotating said crank shaft in either direction, substantially as described.

5. A shear, comprising a frame, a pair of fixed blades mounted on the frame in spaced relation and having their cutting edges substantially horizontal, a T-shaped lever pivoted to said frame on a stationary pivot, a pair of shear blades mounted in spaced relation on the head of said lever on opposite sides of its pivot for cooperation with the fixed blades, said lever having a slot therein, and means for oscillating said lever, comprising a crank shaft, a block carried by the crank pin and slidably mounted in said slot, and means for rotating said crank shaft in either direction, substantially as described.

In testimony whereof I have hereunto set my hand.

RICHARD W. MOSES.